(12) United States Patent
Matsukawa et al.

(10) Patent No.: US 7,524,785 B2
(45) Date of Patent: Apr. 28, 2009

(54) CUBIC BORON NITRIDE SINTERED BODY

(75) Inventors: Michiko Matsukawa, Hyogo (JP); Satoru Kukino, Hyogo (JP); Tomohiro Fukaya, Hyogo (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 327 days.

(21) Appl. No.: 10/585,647

(22) PCT Filed: Jan. 7, 2005

(86) PCT No.: PCT/JP2005/000146

§ 371 (c)(1), (2), (4) Date: Jul. 7, 2006

(87) PCT Pub. No.: WO2005/066381

PCT Pub. Date: Jul. 21, 2005

(65) Prior Publication Data

US 2008/0214383 A1 Sep. 4, 2008

(30) Foreign Application Priority Data

Jan. 8, 2004 (JP) .............. 2004-003467

(51) Int. Cl.
- C04B 35/00 (2006.01)
- C04B 35/50 (2006.01)
- C04B 35/51 (2006.01)
- B24D 3/02 (2006.01)
- C09C 1/68 (2006.01)

(52) U.S. Cl. .................. 501/96.4; 501/96.1; 501/152; 51/307

(58) Field of Classification Search .......... 501/96.4, 501/96.1, 152; 51/307

See application file for complete search history.

(56) References Cited

U.S. PATENT DOCUMENTS

| 4,334,928 A | * | 6/1982 | Hara et al. ............... 75/238 |
| 4,545,968 A | * | 10/1985 | Hirano et al. ............ 423/290 |
| 7,081,424 B2 | * | 7/2006 | Okamura et al. ......... 501/96.4 |
| 2003/0170161 A1 | | 9/2003 | Iizuka |

FOREIGN PATENT DOCUMENTS

| EP | 1547990 A2 | 6/2005 |
| GB | 2048927 A | 12/1980 |
| JP | 59-050075 A | 3/1984 |
| JP | 59-057966 A | 4/1984 |
| JP | 62-108708 A | 5/1987 |
| JP | 63-069760 A | 3/1988 |

OTHER PUBLICATIONS

Supplementary European Search Report issued in European Patent Application No. EP05709234.8-2122 dated on Jun. 10, 2008.

* cited by examiner

Primary Examiner—Jerry Lorengo
Assistant Examiner—Noah S Wiese
(74) Attorney, Agent, or Firm—McDermott Will & Emery LLP

(57) ABSTRACT

The present invention provides a cubic boron nitride sintered body, which achieves both of superior chipping resistance and wear resistance. In accordance with a first aspect of the present invention, a cubic boron nitride (cBN) sintered body contains cubic boron nitride particles and a bonding material used for bonding the cBN particles to one another. This sintered body is constituted by cBN particles in a range from 70 vol % to 98 vol % and a residual bonding material made from a Co compound, an Al compound and WC and a solid solution of these. Moreover, the cBN particles in the sintered body contain 0.03 wt % or less of Mg and 0.001 wt % or more to 0.05 wt % or less of Li. In accordance with a second aspect of the present invention, the cubic boron nitride sintered body has a composition in which the bonding material of the first aspect is changed to an Al compound.

6 Claims, No Drawings

CUBIC BORON NITRIDE SINTERED BODY

RELATED APPLICATION

This application is a national phase of PCT/JP2005/000146 filed on Jan. 7, 2005, which claims priority from Japanese Application No. 2004-003467 filed on Jan. 8, 2004, the disclosures of which Applications are incorporated by reference herein. The benefit of the filing and priority dates of the International and Japanese Applications is respectfully requested.

TECHNICAL FIELD

The present invention relates to a sintered body containing cubic boron nitride (cBN)(hereinafter, referred to as cBN sintered body). In particular, it relates to a cubic boron nitride sintered body that is suitably used as a cutting tool material that is superior in chipping resistance and wear resistance.

BACKGROUND ART

Cubic boron nitride (cBN) has such characteristics as hardness and heat conductivity that are next to diamond, and a low reactivity with iron-based metals in comparison with diamond. Because of the advantages in improving efficiency of processing, cBN sintered bodies containing cBN particles has come to take the place of conventional tools made of cemented carbide and cermet for cutting iron-based hard-to-cut materials.

Conventionally, as described in Patent Document 1, a cBN sintered body, formed by sintering cBN particles through a Ti-ceramic based bonding material, has been known. This sintered body, which has a comparatively low content of cBN particles, has a structure in which the cBN particles are sintered in a manner so as to be enclosed by the bonding material. Therefore, the mutual contact portions between the cBN particles are small. In contrast, another sintered body in which the content of cBN particles in the sintered body is increased so as to exert the features of the cBN, that is, high hardness and high heat conductivity, to the maximum degree has been known.

Patent Document 2 relates to a cBN sintered body in which the ratio of cBN particles is increased to provide a skeleton structure that allows the mutual cBN particles to be made in contact and reacted with each other. Patent Document 2 discloses the cBN sintered body formed by allowing cBN particles to react with each other and be bonded to each other with an Al-based alloy serving as a catalyst. This Patent Document also discloses a method in which, by using an Al alloy of Ni, Co, Mn, Fe, V or Cr as the bonding catalyst, the cBN particles are reacted with each other, while the Al alloy is reacted with the cBN particles, so that a sintered body is produced. Moreover, Patent Document 3 discloses a manufacturing method which provides a sintered body that has a greater content of cBN in the same manner as that of Patent Document 2, and is adjusted in the composition of the Al-based alloy to improve the sintering property so that the cBN sintered body can be obtained under a comparatively low pressure.

Furthermore, Patent Document 4 discloses a sintered body that is obtained by sintering only cBN particles and Al. Since, upon sintering, cBN and Al are allowed to react with each other to form aluminum nitride and aluminum diboride, this sintered body is made from cBN and the aluminum compound. The cBN in the sintered body has a skeleton structure in which the cBN particles are bonded to each other.

Patent Document 1: Japanese Patent Application Laid-Open No. 53-77811
Patent Document 2: Japanese Examined Patent Publication No. 52-43846
Patent Document 3: Japanese Examined Patent Publication No. 57-59228
Patent Document 4: Japanese Examined Patent Publication No. 63-20792

DISCLOSURE OF THE INVENTION

Problems to be Solved by the Invention

In order to obtain a sintered body having a high content of cBN and a skeleton structure, it is necessary to carry out a sintering by making the cBN particles in contact with each other so as to allow the cBN particles to react with each other. However, even in the case when a conventional catalyst is used, since the cBN particles are stable under high-temperature and high-pressure conditions, the cBN particles hardly react with each other, with the result that defects remain at reaction portions between the cBN particles or unreacted portions that are only made in contact with each other tend to remain. For this reason, when such a cBN sintered body is used as a cutting tool, chipping and wear due to coming off of the cBN particles tend to develop from the reaction defective portions between the cBN particles or the unreacted portions.

As a result, in the case of the cBN sintered body in which cBN particles having a high content of cBN are mutually joined into a skeleton structure, it is not possible to provide a sufficient tool life. The objective of the present invention is to solve the above-mentioned problems and to provide a high-hardness sintered body with a high cBN content, which are superior in both of chipping resistance and wear resistance.

Means to Solve the Problems

The inventors of the present invention have studied the bonding mechanism between mutual cBN particles in a cBN sintered body in which cBN particles mutually form a skeleton structure. As a result, they have found that the content of a catalyst component remaining in the cBN particles gives great effects to the bonding force between the mutual cBN particles and defects in reaction portions, and have completed the present invention.

The present invention, which relates to a sintered body in which cBN particles are mutually made in contact with each other, increases the cBN content to exert the cBN property effectively so that reaction defective portions and unreacted portions between the cBN particles can be reduced. With this arrangement, when the resulting sintered body is used as tools, chipping and wear can be prevented, and after various research efforts, the present invention is obtained.

In accordance with a first aspect of the present invention, a cubic boron nitride (cBN) sintered body, which contains cubic boron nitride particles and a bonding material used for bonding the cBN particles to one another, is provided with: cBN particles contained in a range from 70 vol % to 98 vol %; and a residual bonding material constituted by a Co compound, an Al compound and WC and a solid solution of these, and in this structure, the cBN particles in the sintered body contain 0.03 wt % or less of Mg and 0.001 wt % or more to 0.05 wt % or less of Li.

It has been found that, when the cBN content in the cBN sintered body is set in a range from 70 vol % to 98 vol %, the contact and bonding areas between the cBN particles increase. This limitation in the cBN content is effective in reducing reaction defective portions and unreacted portions between cBN particles in the cBN sintered body. This is because in the case of the cBN content of less than 70 vol %, the contact area between mutual cBN particles becomes relatively smaller, making it difficult to form a skeleton structure and failing to obtain effects. Moreover, in the case of the cBN content exceeding 98 vol %, voids appear in the residual bonding material portion other than the cBN particles in the cBN sintered body, with the result that the strength of the sintered body is lowered on the contrary.

Moreover, it has been found that it is effective to form the residual bonding material in the cBN sintered body by using a Co compound, an Al compound and WC and a solid solution of these. Both of the Al and Co having a catalyst function need to be contained in the sintered body, and with this arrangement, the neck growth between the cBN particles can be accelerated. By using these metal, alloy or intermetallic compound as starting materials, a liquid-phase sintering process is carried out to join the cBN particles to one another so that the cBN particles are formed into a skeleton structure. Here, WC is considered to be effective so as to make the coefficient of thermal expansion of the bonding material closer to the coefficient of thermal expansion of the cBN, and the content thereof in the sintered body is preferably set in a range of 0.5 wt % to 5 wt %. Consequently, the sintered body thus obtained can be used as a cutting tool.

It has been found that it is preferable to allow the cBN particles in the cBN sintered body to contain 0.03 wt % or less of Mg and 0.001 wt % or more to 0.05 wt % or less of Li. This is because, in addition to the effect of addition of the above-mentioned Al, Co and WC, a slight amount of Li remaining in the cBN particles functions as a catalyst at contact portions of the cBN particles. In other words, Li makes it possible to reduce reaction defective portions and unreacted portions between the cBN particles so that the cBN particles are firmly bonded (neck growth) to one another. Here, Li is present in the cBN particles as metal Li and $Li_2O_3$, and each of these has a low melting point, and is allowed to again function as a catalyst upon sintering. For this reason, upon sintering, Li is allowed to react with B and N located on the periphery thereof to form a catalyst such as $Li_3BN_2$ so that the neck growth between the cBN particles is accelerated. In the case when Li is insufficient in the cBN particles, the catalyst function becomes insufficient, remaining defects in the bonding portions between the cBN particles. In contrast, in the case when Li is excessive, metal Li or $Li_2O_3$ itself forms a defect, and since the heat resistance of Li is inferior in comparison with cBN, the strength of the cBN sintered body is lowered.

In contrast, Mg, which easily forms an oxide, is mainly present as MgO in the cBN particles, and since MgO has a high melting point, this is not allowed to again function as a catalyst upon sintering. For this reason, in the case when Mg is excessive in the cBN particles, since MgO having no catalytic function is contained in the cBN particles as an impurity, the strength of the sintered body is lowered. In conventional cBN sintered bodies, cBN particles that contain much Mg element and are inexpensive, and easily broken have been considered to be good particles. Based upon the common sense that a sintered body made from fine particles has high strength, cBN particles, which are finely ground easily, have been used. It can be said that the present invention overthrows the conventional common sense in that the content of Mg is limited to a small amount.

As described above, by setting the content of Mg in the cBN to 0.03 wt % or less and the content of Li to 0.001 wt % or more to 0.05 wt % or less, the catalytic function of Li is sufficiently exerted so that defects in the bonding portions of the cBN particles are reduced and the strength of the cBN sintered body is greatly improved. At the same time, since the cBN particles have a high heat conductivity, the rate at which the cBN particles are mutually bonded to one another continuously increases so that the heat conductivity of the cBN sintered body is improved and the wear resistance is also improved greatly.

In accordance with a second aspect of the present invention, a cubic boron nitride (cBN) sintered body, which contains cubic boron nitride particles and a bonding material used for bonding the cBN particles to one another, is provided with: cBN particles in a range from 70 vol % or more to 98 vol % or less; and a residual bonding material constituted by an Al compound, and in this structure, the cBN particles in the sintered body contain 0.03 wt % or less of Mg and 0.001 wt % or more to 0.05 wt % or less of Li.

It has been found that it is effective to prepare the residual bonding material in the cBN sintered body as an Al compound. When Al or an Al alloy and cBN particles are sintered as starting materials, the Al or the Al compound forms a liquid phase, and reacts with the cBN particles to form an Al compound. Here, Al also exerts a catalytic function for bonding the cBN particles to one another, and effectively functions to form a skeleton structure of the cBN particles. The resulting sintered body thus obtained can be used as a cutting tool. Here, the effects of Li and Mg are the same as those described in the first aspect of the invention.

Preferably, the cBN particles in the sintered body contain 0.001 wt % or more to 0.3 wt % or less in total of at least one or more elements selected from the group consisting of Ca, Sr, Ba and Be. This is because each of Ca, Sr, Ba and Be also serves as a catalyst at the contact portions and bonding portions of the cBN particles in the same manner as Li. In the case when the content of these elements is less than 0.001 wt %, the catalytic function becomes insufficient, and in the case when the content exceeds 0.3 wt %, since these elements themselves form defects, and since the heat resistance of the elements becomes inferior in comparison with cBN, the strength and heat resistance of the cBN sintered body is lowered.

Preferably, the cBN particles in the sintered body contain 0.001 wt % or more to 0.5 wt % or less in total of at least one or more elements selected from the group consisting of Si, Ga and La. The inventors of the present invention have found that the addition of one or more elements selected from the group consisting of Si, Ga and La makes it possible to accelerate the catalytic function by Li and the like so that defects at the bonding portions between the cBN particles are effectively reduced and the neck growth between the cBN particles is firmly formed. When the content of these elements is 0.001 wt % or more, the neck growth widely takes place. However, when the content of these elements exceeds 0.5 wt %, these elements themselves form defects, and since the heat resistance of the elements is inferior in comparison with cBN, the strength and heat resistance of the cBN sintered body is lowered.

Preferably, the cBN particles in the sintered body contain 0.01 wt % or less of Mg and 0.01% or more to 0.03 wt % or less of Li. This composition makes it possible to further accelerate bonding between the cBN particles, and consequently to further improve the chipping resistance and crater wear resistance of the sintered body.

Preferably, the sintered body contains 0.001 wt % or more to 1.5 wt % or less in the sintered body in total of at least one or more elements selected from the group consisting of Ti, V, Cr, Zr, Nb, Mo, Ta, Hf, Fe, Ni, Cu and Si (additive bonding materials). The addition of these elements to the sintered body makes it possible to improve both of the wear resistance and chipping resistance.

The sintered body of the present invention may contain inevitable impurities. During processes manufacturing the cBN sintered body, for example, cemented carbide balls, a cemented carbide container and the like are used. Consequently, elements and compounds contained in the cemented carbide tend to be mixed in the cBN sintered body as inevitable impurities.

Effects of the Invention

The sintered body of the present invention has a structure in which cBN particles are directly bonded without defects in the bonding portions between the cBN particles, and consequently makes it possible to provide a high heat conductivity. Therefore, when the sintered body is utilized as a cutting tool and the like, heat is diffused toward the periphery to prevent the tool blade tip from a temperature rise so that it becomes possible to provide a tool having superior wear resistance and chipping resistance.

BEST MODE FOR CARRYING OUT THE INVENTION

Examples of the present invention are described below.

EXAMPLE 1

A cBN powder having an average particle size of 2 μm and a bonding material powder were prepared. This bonding material powder was formed by mixing 50 wt % of Co, 40 wt % of Al and 10 wt % of WC. The bonding material powder and the cBN powder having an average particle size of 2 μm were mixed by using a pot made of cemented carbide alloy together with balls. The resulting powder was charged into a container made of cemented carbide, and sintered at 1400° C. under a pressure of 6.0 GPa for 30 minutes.

Table 1 shows various cBN sintered bodies that were prepared by changing the kind of cBN powder and the ratio of the cBN powder and the bonding material powder. The content of the cBN powder and the amount of a catalyst element were measured by using the following method: First, in order to measure the contents of elements in the cBN sintered body, after the sintered body had been dissolved by using a molten salt method, the respective elements were quantitatively measured by using an Inductively Coupled Plasma Atomic Emission Spectroscopy (ICP method). Based upon the results of the measurements, the content of cBN particles in the cBN sintered body was calculated in volume %. Here, the calculation of the content was carried out on the assumption that Co, Al and the like that were compositions other than cBN and WC were included as metals as they were.

TABLE 1

| Sample No. | cBN Content (volume %) | Catalyst Element Content | | |
|---|---|---|---|---|
| | | Li (weight %) | Mg (weight %) | Others (weight %) |
| 1* | 65* | 0.021 | 0.007 | |
| 2 | 75 | 0.022 | 0.006 | |
| 3 | 85 | 0.021 | 0.007 | |
| 4 | 90 | 0.020 | 0.007 | |
| 5 | 95 | 0.019 | 0.008 | |
| 6* | 99* | 0.020 | 0.007 | |

TABLE 1-continued

| Sample No. | cBN Content (volume %) | Catalyst Element Content | | |
|---|---|---|---|---|
| | | Li (weight %) | Mg (weight %) | Others (weight %) |
| 7* | 90 | * | 0.007 | |
| 8 | 90 | 0.006 | 0.007 | |
| 9 | 90 | 0.013 | 0.008 | |
| 10 | 90 | 0.041 | 0.007 | |
| 11* | 90 | 0.062* | 0.006 | |
| 12 | 90 | 0.020 | 0.002 | |
| 13 | 90 | 0.020 | 0.015 | |
| 14* | 90 | 0.022 | 0.040* | |
| 15 | 90 | 0.021 | 0.007 | Ca; 0.05 |
| 16 | 90 | 0.020 | 0.007 | Ca; 0.1 |
| 17 | 90 | 0.021 | 0.008 | Ca; 0.4 |
| 18 | 90 | 0.021 | 0.007 | Sr; 0.05 |
| 19 | 90 | 0.020 | 0.007 | Ba; 0.03 |
| 20 | 90 | 0.020 | 0.007 | Ca; 0.1, Sr; 0.08 |
| 21 | 90 | 0.019 | 0.007 | Ca; 0.1, Be; 0.05 |
| 22 | 90 | 0.021 | 0.007 | Ca; 0.2, Sr; 0.2 |
| 23 | 90 | 0.021 | 0.007 | Ca; 0.06, Si; 0.12 |
| 24 | 90 | 0.020 | 0.007 | Ca; 0.07, Si; 0.40 |
| 25 | 90 | 0.020 | 0.008 | Ca; 0.07, Si; 0.61 |
| 26 | 90 | 0.020 | 0.008 | Ca; 0.09, Sr; 0.07, Si; 0.10 |
| 27 | 90 | 0.020 | 0.007 | Ca; 0.06, Ga; 0.10 |
| 28 | 90 | 0.021 | 0.006 | Ca; 0.07, La; 0.09 |

*derived from Comparative Example

Moreover, the cBN sintered body was treated in a tightly closed container with a mixed solution of hydrofluoric acid and nitric acid prepared by mixing 40 ml of a diluent obtained by doubly-diluting nitric acid having a concentration of 60% or more to less than 65% and 10 ml of hydrofluoric acid having a concentration of 45% to 50% at a temperature of 120° C. or more to less than 150° C. for 48 hours. All the bonding phase was dissolved in the mixed solution between hydrofluoric acid and nitric acid with the cBN skeleton structure remaining without being dissolved. Elements of Mg, Li, Ca, Sr, Ba, Be, Si, Ga and La, contained in this cBN skeleton structure, were quantitatively measured by the Inductively Coupled Plasma Atomic Emission Spectroscopy (ICP method).

Next, the cutting performance of each cBN sintered body that had a backing of cemented carbide was evaluated. The cBN sintered body was machined to obtain cutting chips having a shape of SNGA120408 in accordance with the ISO standard. Next, cutting tests were carried out by using these cutting chips under the following conditions so that the amount of flank wear was evaluated.

Workpiece material: ductile cast iron, FCD450 round bar, outer diameter machining Cutting conditions: cutting speed V=400 m/min., depth of cut d=0.2 mm, feed f=0.2 mm/rev., wet type Cutting time: 10 minutes Table 2 shows the results of evaluation.

TABLE 2

| Sample No. | Example 1 | Example 2 | | Example 3 |
|---|---|---|---|---|
| | Amount of Flank Wear (mm) | Number of Heat checks (number) | Heat Conductivity W/(m · K) | Time Span Up to Chipping (min) |
| 1* | 0.222 | chipped | 60 | 2 |
| 2 | 0.123 | 5 | 130 | 12 |
| 3 | 0.113 | 4 | 140 | 13 |
| 4 | 0.106 | 4 | 160 | 13 |
| 5 | 0.103 | 2 | 170 | 15 |

TABLE 2-continued

|  | Example 1 | Example 2 | | Example 3 |
|---|---|---|---|---|
| Sample No. | Amount of Flank Wear (mm) | Number of Heat checks (number) | Heat Conductivity W/(m · K) | Time Span Up to Chipping (min) |
| 6* | chipped | chipped | 80 | 1 |
| 7* | 0.21 | 28 | 90 | 4 |
| 8 | 0.145 | 8 | 140 | 10 |
| 9 | 0.135 | 5 | 150 | 12 |
| 10 | 0.137 | 9 | 130 | 11 |
| 11* | 0.282 | 20 | 90 | 5 |
| 12 | 0.099 | 2 | 170 | 14 |
| 13 | 0.147 | 9 | 120 | 10 |
| 14* | 0.361 | 23 | 80 | 5 |
| 15 | 0.094 | 2 | 170 | 14 |
| 16 | 0.09 | none | 180 | 15 |
| 17 | 0.133 | 5 | 140 | 13 |
| 18 | 0.098 | 2 | 160 | 15 |
| 19 | 0.096 | 1 | 160 | 15 |
| 20 | 0.092 | 2 | 160 | 14 |
| 21 | 0.092 | none | 170 | 17 |
| 22 | 0.129 | 6 | 140 | 13 |
| 23 | 0.087 | none | 180 | 17 |
| 24 | 0.09 | none | 190 | 18 |
| 25 | 0.108 | 5 | 150 | 13 |
| 26 | 0.086 | none | 200 | 16 |
| 27 | 0.085 | none | 190 | 16 |
| 28 | 0.088 | none | 190 | 17 |

*derived from Comparative Example

Upon comparing samples 1 to 6 with one another, it was found that sample 1 having a cBN content of less than 70 vol % had a great amount of flank wear and was inferior in wear resistance in comparison with samples 2 to 5 that were manufactured based upon the scope of the present invention. This is because the cBN content was so small that the cBN particles failed to mutually form a skeleton structure, resulting in coming off of cBN particles upon cutting. Moreover, sample 6 in which the cBN content exceeded 98 vol % had chipping. This is because the bonding material compositions were small so that many defects were contained in the sintered body and because the neck growth between the mutual cBN particles, exerted by the bonding material compositions, was not sufficiently accelerated.

Samples 4, 7, 11 and 14 were compared with one another, and the following facts were found. In comparison with sample 4 formed based upon the present invention, sample 7 from which no Li had been detected was inferior in wear resistance. This is presumably because, since the mutual reaction between cBN particles due to the catalyst effect only by Co, Al and the like that are additive bonding materials causes remaining unreacted portions and reaction defective portions, coming off of particles occurs from these portions to make the amount of wear greater. Moreover, samples 11 and 14, which have greater amounts of Li and Mg than the scope of the present invention, are also inferior in wear resistance in comparison with sample 4. This is presumably because, since excessive Li and Mg in cBN particles cause chipping, coming off of particles occurs upon cutting, resulting in degradation in wear resistance.

Based upon comparisons among samples 4, 7, 8, 9 and 10 that have an amount of Mg of less than 0.01 wt %, it is found that, when the Li content in cBN particles is from 0.01 wt % or more to 0.03 wt % or less, the resulting samples are superior in wear resistance. Based upon comparisons among samples 4, 13 and 14 in which Li is 0.01 wt % or more to 0.03 wt % or less, it is found that, when the Mg content in cBN particles is 0.01 wt % or less, the resulting samples are superior in wear resistance.

Based upon comparisons between sample 4 and samples 15 to 22, it is found that, in comparison with sample 4 containing none of Ca, Sr, Ba and Be in cBN particles, samples 15, 16, 18 to 21, which contain 0.001 wt % or more to 0.3 wt % or less in total of at least one kind of elements, Ca, Sr, Ba and Be in cBN particles, are superior in wear resistance. Moreover, based upon samples 17 and 22, it is found that excessive amounts of Ca and Sr fail to provide an effect for improving the wear resistance.

Based upon comparisons between sample 4 and samples 23 to 28, it is found that, in comparison with sample 4 containing none of Si, Ga and La in cBN particles, samples 23, 24 and 26 to 28, which contain 0.001 wt % or more to 0.5 wt % or less in total of at least one kind of elements, Si, Ga and La in cBN particles, are superior in wear resistance. Moreover, based upon sample 25, it is found that an excessive amount of Si fails to provide an effect for improving the wear resistance.

EXAMPLE 2

The sintered body, manufactured in Example 1, were evaluated on heat check and heat conductivity. The heat conductivity was measured by using a laser flash method or an AC calorimetric method. Moreover, each of the cBN sintered bodies was machined to obtain a cutting chip having a shape of SNGA090312 in accordance with the ISO standard. Next, cutting tests were carried out by using these chips under the following conditions so that the number of heat checks was counted, and these chips were evaluated.

Workpiece material: gray iron, FC250, milling Cutting conditions: cutting speed V=2500 m/min., depth of cut Rd=30 mm, Ad=0.3 mm Feed f=0.2 mm/blade, dry type, cutting time: 30 minutes Table 2 shows the results of evaluation.

Upon comparing samples 1 to 6 with one another, it was found that sample 1 having a cBN content of less than 70 vol % had chipping considered to be caused by heat checks, and no evaluation on the number of heat checks was obtained; however, samples 2 to 5, formed based upon the scope of the present invention, had no chipping although 2 to 5 cracks appeared. This is because the cBN content of sample 1 out of the scope of the present invention was so small that the cBN particles having superior heat characteristics failed to mutually form a skeleton structure to cause a reduction in heat conductivity and the subsequent degradation in heat resistance. Moreover, sample 6 in which the cBN content exceeded 98 vol % also had chipping. This is because the bonding material compositions were small with the result that many defects were contained in the sintered body. Consequently, the neck growth between the mutual cBN particles, exerted by the bonding material compositions, was not sufficiently accelerated to cause insufficient toughness.

Samples 4, 7, 11 and 14 were compared with one another, and the following facts were found. In comparison with sample 4 formed based upon the scope of the present invention, sample 7 from which no Li had been detected had a more number of heat checks. This is presumably because, since the mutual reaction between cBN particles due to the catalyst effect only by additive bonding materials causes remaining unreacted portions and reaction defective portions, the heat conductivity of the cBN sintered body becomes lower to consequently cause degradation in heat resistance. Moreover, samples 11 and 14, which have greater amounts of Li and Mg than the scope of the present invention, also have a more number of heat checks. This is presumably because, since excessive Li and Mg in cBN particles are contained in the cBN skeleton structure, the excessive portions become impurities in the cBN skeleton structure having a high heat conductivity to cause a low heat conductivity in the cBN sintered body and the subsequent degradation in heat resistance.

Based upon comparisons among samples 4, 7, 8, 9 and 10 that have an amount of Mg of less than 0.01 wt %, it is found that, when the Li content in cBN particles is from 0.01 wt % or more to 0.03 wt % or less, the resulting samples have a smaller number of heat checks and become superior in heat resistance. Based upon comparisons among samples 4, 13 and 14 in which Li is 0.01 wt % or more to 0.03 wt % or less, it is found that, when the Mg content in cBN particles is 0.01 wt % or less, the resulting samples have a smaller number of heat checks and become superior in wear resistance.

Based upon comparisons between sample 4 and samples 15 to 22, it is found that, in comparison with sample 4 containing none of Ca, Sr, Ba and Be in cBN particles, samples 15, 16, 18 to 21, which contain 0.001 wt % or more to 0.3 wt % or less in total of at least one kind of elements, Ca, Sr, Ba and Be, have a smaller number of heat checks and become superior in heat resistance. Moreover, based upon samples 17 and 22, it is found that excessive amounts of Ca and Sr fail to provide an effect for improving the heat resistance.

Based upon comparisons between sample 4 and samples 23 to 28, it is found that, in comparison with sample 4 containing none of Si, Ga, and La in cBN particles, samples 23, 24 and 26 to 28, which contain 0.001 wt % or more to 0.5 wt % or less in total of at least one kind of elements, Si, Ga and La, are less susceptible to heat checks, and superior in heat resistance. Moreover, based upon samples 25, it is found that an excessive amount of Si fails to provide an effect for improving the heat resistance.

EXAMPLE 3

The sintered body, manufactured in Example 1, were used to evaluate chipping resistance. First, each of the cBN sintered bodies was machined to obtain a cutting chip having a shape of SNGA120408 in accordance with the ISO standard. Next, cutting tests were carried out by using these chips under the following conditions so that the span of time up to chipping was measured, and evaluated.

Workpiece material: gray iron, FC300, six round bars with V-shaped groove, outer diameter machining Cutting conditions: cutting speed V=700 m/min., depth of cut d=0.5 mm Feed f=0.2 mm/rev., dry type Table 2 shows the results of evaluation.

Upon comparing samples 1 to 6 with one another, it was found that sample 1 having a cBN content of less than 70 vol % caused chipping in the initial stage of cutting, and its tool life against chipping was 1/6 to 1/8 of that of samples 2 to 5 manufactured based upon the scope of the present invention. This is because the cBN content of the sample 1 out of the scope of the present invention was so small that the cBN particles failed to mutually form a skeleton structure to cause a reduction in toughness in the sintered body. Moreover, sample 6 in which the cBN content exceeded 98 vol % also had chipping in the initial stage of cutting. This is because the bonding material compositions were small so that many defects were contained in the sintered body and because the neck growth between the mutual cBN particles, exerted by the bonding material compositions, was not sufficiently accelerated to cause insufficient toughness.

Samples 4, 7, 11 and 14 were compared with one another, and the following facts were found. In comparison with sample 4 formed based upon the present invention, sample 7 from which no Li had been detected had a time span up to chipping of 1/3 to indicate a short tool life. This is presumably because, since the mutual reaction between cBN particles due to the catalyst effect only by additive bonding materials causes remaining unreacted portions and reaction defective portions, the resulting material has insufficient toughness. Moreover, samples 11 and 14, which have greater amounts of Li and Mg than the scope of the present invention, also have a shorter time span up to chipping in comparison with sample 4 manufactured based upon the scope of the present invention. This is presumably because, since excessive Li and Mg in cBN particles cause defects in the cBN skeleton, chipping occurs from these defects upon cutting.

Based upon comparisons among samples 4, 7, 8, 9 and 10 that have an amount of Mg of less than 0.01 wt %, it is found that, when the Li content in cBN particles is from 0.01 wt % or more to 0.03 wt % or less, the resulting samples have a longer time span up to chipping, and are superior in chipping resistance. Based upon comparisons among samples 4, 13 and 14 in which Li is 0.01 wt % or more to 0.03 wt % or less, it is found that, when the Mg content in cBN particles is 0.01 wt % or less, the resulting samples have a longer time span up to chipping, and are superior in chipping resistance.

Based upon comparisons between sample 4 and samples 15 to 22, it is found that, in comparison with sample 4 containing none of Ca, Sr, Ba and Be in cBN particles, samples 15, 16, 18 to 21, which contain 0.001 wt % or more to 0.3 wt % or less in total of at least one kind of elements, Ca, Sr, Ba and Be, have a longer time span up to chipping, and are superior in chipping resistance. Moreover, based upon samples 17 and 22, it is found that excessive amounts of Ca and Sr fail to provide an effect for improving the chipping resistance.

Based upon comparisons between sample 4 and samples 23 to 28, it is found that, in comparison with sample 4 containing none of Si, Ga and La in cBN particles, samples 23, 24 and 26 to 28, which contain 0.001 wt % or more to 0.5 wt % or less in total of at least one kind of elements, Si, Ga and La, are superior in chipping resistance. Moreover, based upon samples 25, it is found that an excessive amount of Si fails to provide an effect for improving the chipping resistance.

EXAMPLE 4

The sintered body, manufactured in Example 1, were used to evaluate transverse rupture strength. First, each of samples Nos. 4, 7, 11 and 14 were measured in their transverse rupture strength. Each of the samples was cut into measuring test pieces with a length of 6 mm, a width of 3 mm and a thickness in a range from 0.4 to 0.45 mm. The measurements were carried out with a span of 4 mm. The resulting values were 224 kgf/mm$^2$, 170 kgf/mm$^2$, 182 kgf/mm$^2$ and 175 kgf/mm$^2$ in the order of the above-mentioned sample Nos.

Samples 4, 7, 11 and 14 were compared with one another, and the following facts were found. In comparison with sample 4 formed based upon the present invention, sample 7 from which no Li had been detected had a low transverse rupture strength. This is presumably because, since the mutual reaction between cBN particles due to the catalyst effect only by additive bonding materials causes remaining unreacted portions and reaction defective portions, ruptures in the sintered body occur from these portions. Moreover, samples 11 and 14, which have greater amounts of Li and Mg than the scope of the present invention, also have a reduction in the transverse rupture strength. This is presumably because, since excessive Li and Mg in cBN particles cause defects, with the result that rupturess in the sintered body occur from these portions.

EXAMPLE 5

In this Example, the wear resistance of the present invention was evaluated. A cBN powder having an average particle size of 10 μm was charged into a Mo container, and sintered at 1400° C. under a pressure of 6.0 GPa for 30 minutes, with Al being infiltrated therein. With respect to the resulting cBN sintered bodies, by using the same method as Example 1, the content of the cBN particles was measured in vol %. Moreover, the binder phase of the cBN sintered body was dissolved in the same method as Example 1, and the elements, contained in the residual cBN skeleton structure, were quantitatively measured. The results of measurements on the elements found from this sintered body were virtually the same as those contents of elements contained in the material cBN particles prior to the sintering process. Table 3 shows the cBN content of each of the sintered bodies thus obtained and the amount of each of catalyst elements in cBN powder.

TABLE 3

| Sample No. | cBN Content (volume %) | Content after Hydrofluoric Acid Treatment on Sintered Body | | Amount of Flank Wear (mm) |
|---|---|---|---|---|
| | | Li (weight %) | Mg (weight %) | |
| 29 | 88 | 0.020 | 0.007 | 0.185 |
| 30 | 88 | | 0.070 | 0.336 |
| 31 | 88 | 0.066 | 0.080 | 0.295 |
| 32 | 88 | 0.021 | 0.050 | 0.302 |
| 33 | 88 | 0.021 | 0.030 | 0.200 |
| 34 | 88 | 0.05 | 0.007 | 0.190 |
| 35 | 88 | 0.05 | 0.03 | 0.220 |
| 36 | 88 | 0.06 | 0.03 | 0.270 |
| 37 | 88 | 0.05 | 0.04 | 0.270 |

The resulting cBN sintered body was machined to obtain a cutting chip having a shape of SNGA120408 in accordance with the ISO standard. Next, cutting tests were carried out by using these chips under the following conditions so that the amount of flank wear was evaluated.

Workpiece material: ductile cast iron, FCD450 round bar, outer diameter machining Cutting conditions: cutting speed V=300 m/min., depth of cut d=0.3 mm Feed f=0.2 mm/rev., wet type Cutting time: 15 minutes Table 3 shows the results of evaluation.

The results of comparisons on samples 29 to 37 show that in comparison with samples 29, 33, 34, and 35 formed based upon the scope of the present invention, sample 30 from which no Li had been detected was inferior in wear resistance. This is presumably because, since the mutual reaction between cBN particles due to the catalyst effect only by additive bonding materials causes remaining unreacted portions and reaction defective portions, coming off of particles occurs from these portions upon cutting to cause an increase in the amount of wear. Moreover, samples 31, 32, 36, and 37, which have greater amounts of Li and Mg than the scope of the present invention, also cause degradation in the wear resistance. This is presumably because, since excessive Li and Mg in cBN particles cause defects, coming off of particles occur upon cutting, resulting in degradation in the wear resistance.

EXAMPLE 6

In the same manner as Example 1, a cBN powder having an average particle size of 2 μm, a bonding material powder and an additive bonding material powder having a particle size of 1 μm or less were prepared. The bonding material powder was composed of 50 wt % of Co, 40 wt % of Al and 10 wt % of WC in the same manner as Example 1. Each of the additive bonding material powders was prepared by mixing one kind or more element powders selected from the group consisting of Ti, V, Cr, Zr, Nb, Mo, Ta, Hf, Fe, Ni, Cu and Si at an amount in the sintered body in total as shown in Table 4. Next, the cBN powder, the bonding material powder and each of the additive bonding material powders were mixed. This mixed powder was further mixed by using a pot made of cemented carbide together with balls. The resulting mixed powder was sintered at 1400° C. under a pressure of 6.0 GPa for 30 minutes in the same manner as the Examples.

The content of the cBN powder and the amount of a catalyst element were measured by using the following method: First, in order to measure the contents of elements in the cBN sintered body, after the sintered body had been dissolved by using a molten salt method, the respective elements were quantitatively measured by using an Inductively Coupled Plasma Atomic Emission Spectroscopy (ICP method). Based upon the results of the measurements, the content of cBN particles in the cBN sintered body was calculated in volume %. Here, the calculation of the content was carried out on the assumption that Ti, V, Cr, Zr, Nb, Mo, Ta, Hf, Fe, Ni, Cu, Si and the like that were compositions other than cBN and WC were included as metals as they were.

TABLE 4

| Sample No. | cBN Content (volume %) | Catalyst Element Content | | Additive Bonding Material (weight % in Sintered Body) |
|---|---|---|---|---|
| | | Li (weight %) | Mg (weight %) | |
| 38 | 90 | 0.020 | 0.015 | none |
| 39 | 90 | 0.020 | 0.015 | V: 0.0005 |
| 40 | 90 | 0.020 | 0.015 | V: 0.001 |
| 41 | 90 | 0.020 | 0.015 | V: 0.01 |
| 42 | 90 | 0.020 | 0.015 | V: 0.1 |
| 43 | 90 | 0.020 | 0.015 | V: 1.0 |
| 44 | 90 | 0.020 | 0.015 | V: 1.5 |
| 45 | 90 | 0.020 | 0.015 | V: 2.0 |
| 46 | 90 | 0.020 | 0.015 | Ti: 1.0 |
| 47 | 90 | 0.020 | 0.015 | Zr: 1.0 |
| 48 | 90 | 0.020 | 0.015 | Nb: 1.0 |
| 49 | 90 | 0.020 | 0.015 | Mo: 1.0 |
| 50 | 90 | 0.020 | 0.015 | Ta: 1.0 |
| 51 | 90 | 0.020 | 0.015 | Hf: 1.0 |
| 52 | 90 | 0.020 | 0.015 | Cr: 1.0 |
| 53 | 90 | 0.020 | 0.015 | Cu: 1.0 |
| 54 | 90 | 0.020 | 0.015 | Cu: 2.0 |
| 55 | 90 | 0.020 | 0.015 | Fe: 1.0 |
| 56 | 90 | 0.020 | 0.015 | Ni: 1.0 |
| 57 | 90 | 0.020 | 0.015 | Si: 1.0 |
| 58 | 90 | 0.020 | 0.015 | V: 0.4, Ti: 0.3, Zr: 0.3 |
| 59 | 90 | 0.020 | 0.015 | V: 0.8, Ti: 0.6, Zr: 0.6 |

Next, the cutting performance of each cBN sintered body had a backing of cemented carbide was evaluated. The cBN sintered body was machined to obtain a cutting chip having a shape of SNGA120408 in accordance with the ISO standard. Next, cutting tests were carried out by using these chips under the following conditions so that the amount of flank wear was evaluated.

Workpiece material: ductile cast iron; FCD450 round bar, outer diameter machining Cutting conditions: cutting speed V=400 m/min., depth of cut d=0.2 mm, Feed f=0.2 mm/rev., wet type Cutting time: 10 minutes Table 5 shows the results of evaluation.

TABLE 5

| Sample No. | Amount of Flank Wear (mm) | Time Span Up to Chipping (min) |
|---|---|---|
| 38 | 0.147 | 10 |
| 39 | 0.150 | 9 |
| 40 | 0.120 | 15 |
| 41 | 0.115 | 18 |
| 42 | 0.110 | 20 |
| 43 | 0.105 | 25 |
| 44 | 0.110 | 21 |
| 45 | 0.165 | 5 |
| 46 | 0.105 | 24 |
| 47 | 0.106 | 27 |
| 48 | 0.105 | 24 |
| 49 | 0.105 | 23 |
| 50 | 0.105 | 22 |
| 51 | 0.106 | 22 |
| 52 | 0.115 | 15 |
| 53 | 0.105 | 30 |
| 54 | 0.170 | 4 |
| 55 | 0.115 | 15 |
| 56 | 0.120 | 12 |
| 57 | 0.118 | 14 |
| 58 | 0.105 | 25 |
| 59 | 0.170 | 4 |

Comparisons on samples 38 to 59 indicate that when 0.001 to 1.5 wt % of an additive bonding material is added to a sintered body in wt % in the sintered body, both of wear resistance and chipping resistance can be improved. This is presumably because by adding a slight amount of at least one or more elements selected from the group consisting of Ti, V, Cr, Zr, Nb, Mo, Ta, Hf, Fe, Ni, Cu and Si to a Co or Al-based metallic bonding material that has a function for forming a neck growth between mutual cBN particles, the function for forming the neck growth is accelerated. However, as shown by samples 45, 54 and 59, when the additive bonding material exceeding 1.5 wt % in the sintered body in wt % is added thereto, the cutting performance drops abruptly so that it is assumed that the excessive amount of addition inhibits formation of the neck growth, on the contrary.

INDUSTRIAL APPLICABILITY

In the cBN sintered body of the present invention, since cBN particles are directly bonded to each other, a high heat conductivity is achieved. Therefore, the cubic boron nitride sintered body of the present invention is applied not only to cutting tools, but also to other applications requiring a high heat conductivity such as heat sinks.

The invention claimed is:

1. A cubic boron nitride (cBN) sintered body comprising:
cBN particles in a range from 70 vol % to 98 vol %; and
a bonding material consisting of a Co compound, an Al compound and WC and a solid solution of these,
wherein the cBN particles in the sintered body contain 0.03 wt % or less of Mg and 0.001 wt % to 0.05 wt % of Li.

2. A cubic boron nitride (cBN) sintered body comprising:
cBN particles in a range from 70 vol % to 98 vol %; and
a bonding material consisting of an Al compound,
wherein the cBN particles in the sintered body contain 0.03 wt % or less of Mg and 0.001 wt % to 0.05 wt % of Li.

3. The cubic boron nitride sintered body according to claim 1 or claim 2, wherein the cBN particles in the sintered body contains 0.001 wt % or more to 0.3 wt % or less in total of at least one or more elements selected from the group consisting of Ca, Sr, Ba and Be.

4. The cubic boron nitride sintered body according to claim 1 or claim 2, wherein the cBN particles in the sintered body contains 0.001 wt % or more to 0.5 wt % or less in total of at least one or more elements selected from the group consisting of Si, Ga and La.

5. The cubic boron nitride sintered body according to claim 1 or claim 2, wherein the cBN particles in the sintered body contains 0.01 wt % or less of Mg and 0.01% or more to 0.03 wt % or less of Li.

6. The cubic boron nitride sintered body according to claim 1 or claim 2, wherein the sintered body contains 0.001 wt % or more to 1.5 wt % or less in the sintered body in total of at least one or more elements selected from the group consisting of Ti, V, Cr, Zr, Nb, Mo, Ta, Hf, Fe, Ni, Cu and Si.

* * * * *